United States Patent [19]
Fukada

[11] Patent Number: 5,927,421
[45] Date of Patent: Jul. 27, 1999

[54] DEVICE FOR CONTROLLING ENGINE INTAKE THROTTLE FOR TURN STABILITY CONTROL OF VEHICLE

[75] Inventor: Yoshiki Fukada, Susono, Japan

[73] Assignee: Toyota Jidosha Kabushiki Kaisha, Toyota, Japan

[21] Appl. No.: 08/815,160

[22] Filed: Mar. 11, 1997

[30] Foreign Application Priority Data

Mar. 25, 1996 [JP] Japan .................................. 8-094794

[51] Int. Cl.$^6$ ................................................. B60K 41/00
[52] U.S. Cl. ............................................ 180/197; 701/72
[58] Field of Search ........................... 180/197; 701/82, 701/84, 85, 70, 72

[56] References Cited

U.S. PATENT DOCUMENTS

| | | | |
|---|---|---|---|
| 5,014,809 | 5/1991 | Matsuda | 180/197 |
| 5,276,624 | 1/1994 | Ito et al. | 701/72 |
| 5,576,959 | 11/1996 | Hrovat et al. | |
| 5,749,062 | 5/1998 | Yamamoto et al. | 701/72 |
| 5,822,709 | 10/1998 | Fujita | 701/70 |

FOREIGN PATENT DOCUMENTS

| | | |
|---|---|---|
| A-6485862 | 3/1989 | Japan. |
| A-6487844 | 3/1989 | Japan. |
| A-2-161146 | 6/1990 | Japan. |
| A-6-221968 | 8/1994 | Japan. |

*Primary Examiner*—Kevin Hurley
*Attorney, Agent, or Firm*—Oliff & Berridge, PLC

[57] ABSTRACT

A device for controlling intake throttle of an engine of a vehicle having: a means for estimating an instability quantity representative of turning instability of the vehicle; a means for estimating lateral acceleration of the vehicle; a means for estimating friction coefficient of road surface; a means for estimating a brake limit of a pair of drive wheels based upon the lateral acceleration and the road surface friction coefficient; a means for estimating an engine brake torque limit based upon the brake limit of the pair of drive wheels of the vehicle and the instability quantity; a means for estimating a target intake throttle value corresponding to the engine brake torque limit; and a means for attenuating intake throttling of the engine to the target intake throttle value when the intake throttling is tighter than the target intake throttle value.

6 Claims, 10 Drawing Sheets

FIG. 16

DEVICE FOR CONTROLLING ENGINE INTAKE THROTTLE FOR TURN STABILITY CONTROL OF VEHICLE

BACKGROUND OF THE INVENTION

1. Field of the Invention

The present invention relates generally to a running behavior control of a vehicle such as an automobile, and more particularly to a device for controlling intake throttle of an engine of a vehicle for a turn stability control of the vehicle.

2. Description of the Prior Art

It is known in the art of running stability control of vehicles that, when a vehicle driven at the rear wheels turns along a curved course at high speed with engine braking, the vehicle is liable to spin due to a saturation of the tire grip of the rear wheels to the road surface against the centrifugal side force, while when a vehicle driven at the front wheels turns along a curved course at high speed with engine braking, the vehicle is liable to drift out due to a saturation of the tire grip of the front wheels to the ground surface against the centrifugal side force. In order to meet with such a problem, it has been proposed in Japanese Patent Laid-open Publication 64-87844 filed by the same assignee as the present application to control the fuel supply system of the engine of a vehicle such that, when a slippage of the driving wheels is detected during an engine braked running of the vehicle, fuel cut is dissolved. According to this prior art, if the engine rotation speed increases beyond a predetermined threshold value when a vehicle is running with its intake throttle valve being fully closed, its fuel supply system is positively cut for the purposes of increasing the effect of the engine braking and reducing the emission of fuel components into the atmosphere. The dissolving of fuel cut is to dissolve such a positive cutting of the fuel supply system when the vehicle is liable to slip due to a hard engine braking.

SUMMARY OF THE INVENTION

The present invention contemplates to further develop the concept of attenuating the engine braking of a vehicle to retain the running behavior thereof against getting instable by a slippage of the driving wheels on the road surface due to a hard engine braking, such that the attenuation of engine braking is continuously trimmed to be necessary minimum, so as thereby to avoid any abrupt change of engine braking effect for further improvement of driving comfortability of the vehicle, while suppressing the total emission of fuel components into the atmosphere as integrated throughout the period of engine braked operation, said trimming of the engine braking attenuation being effected to trace a critical boarder between stability and instability of the running behavior of the vehicle all through the driving period of the vehicle.

In order to accomplish such an object, the present invention proposes a device for controlling intake throttle of an engine of a vehicle having a vehicle body, and pairs of front and rear wheels supporting the vehicle body, at least the pair of rear wheels or the pair of front wheels being drive wheels adapted to be driven by the engine, the intake throttle control device comprising:

a means for estimating an instability quantity representative of turning instability of the vehicle;

a means for estimating lateral acceleration of the vehicle;

a means for estimating friction coefficient of road surface;

a means for estimating a brake limit of the pair of drive wheels based upon the lateral acceleration and the road surface friction coefficient;

a means for estimating an engine brake torque limit based upon said brake limit of the pair of drive wheels and said instability quantity;

a means for estimating a target intake throttle value corresponding to said engine brake torque limit; and a means for attenuating intake throttling of the engine to said target intake throttle value when the intake throttling is tighter than said target intake throttle value.

When an engine of a vehicle is controlled of its engine braking intake throttling by a device of the above-mentioned construction, if the vehicle is going to spin or drift out during a turn running thereof due to a hard engine braking, the intake throttle valve is opened from its fully closed condition by a necessary minimum amount which is continually varied to trace a critical border between stability and instability of turn behavior of the vehicle, thereby ensuring a maximum availability of engine braking during the turn of the vehicle, without sacrificing the turn stability of the vehicle.

When the vehicle is adapted such that the pair of rear wheels are driven by the engine, said instability quantity estimation means may estimate a spin quantity representative of liability of the vehicle to a spin as said instability quantity.

When the vehicle is adapted such that the pair of front wheels are driven by the engine, said instability quantity estimation means may estimate a drift-out quantity representative of liability of the vehicle to a drift-out as said instability quantity.

The intake throttle control device may further comprise a means for estimating slip ratio of at least one of the pair of drive wheels, and a means for gating said intake throttling attenuation means to allow said intake throttling attenuation operation only when the slip ratio of said at least one drive wheel is larger than a threshold value determined therefor.

The intake throttle control device may further comprise a means for estimating engine output torque, and a means for gating said intake throttling attenuation means to allow said intake throttling attenuation operation only when the engine output torque is negative.

The intake throttle control device may further comprise a means for detecting operation of a foot brake system of the vehicle, and a means for gating said intake throttling attenuation means to allow said intake throttling attenuation operation only when said foot brake system operation detection means is not detecting operation of the foot brake system.

BRIEF DESCRIPTION OF THE DRAWINGS

In the accompanying drawings.

DESCRIPTION OF THE EMBODIMENTS

In the following, the present invention will be described with respect to some preferred embodiments with reference to the accompanying drawings.

Figure 1:
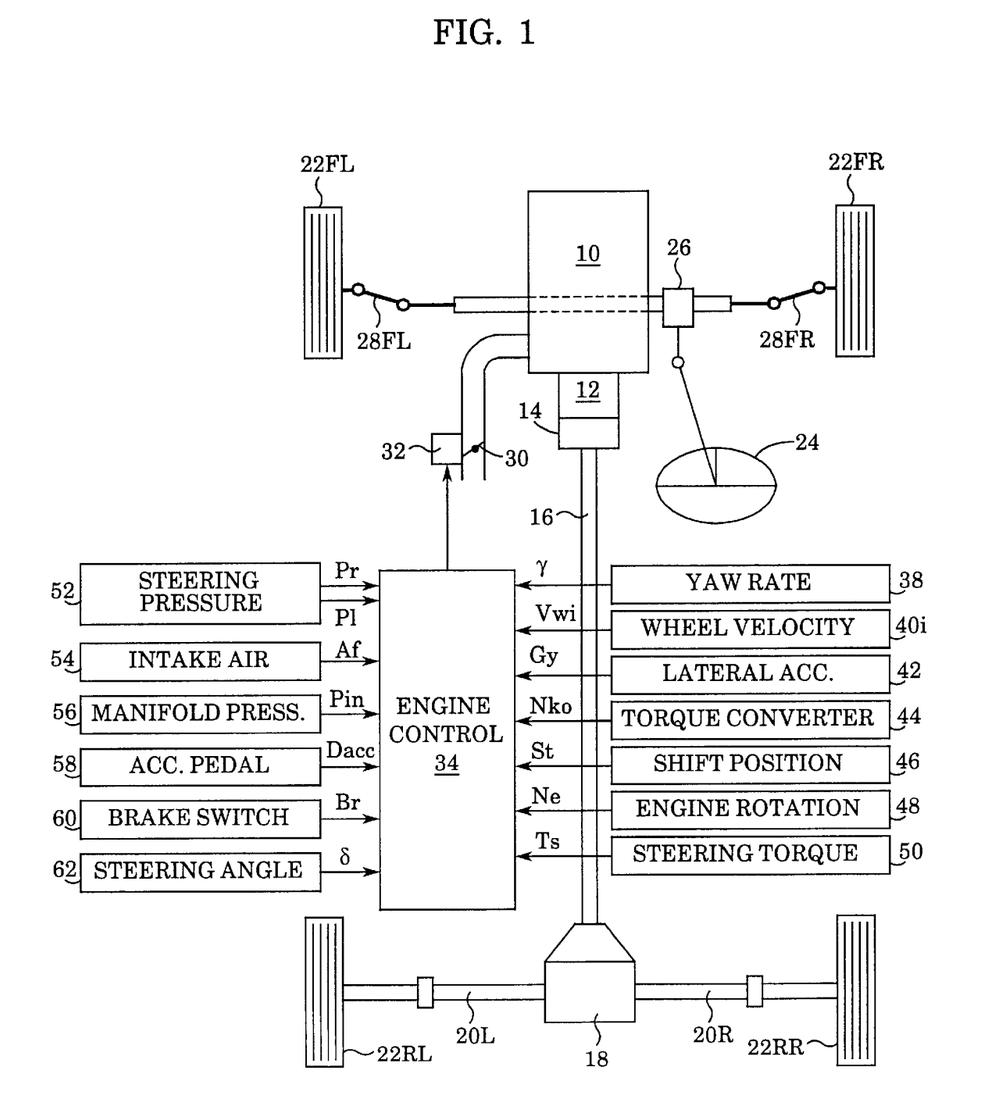
FIG. 1 is a diagrammatic illustration of the device for controlling engine intake throttle according to the present invention as installed in a vehicle together with various sensors for obtaining data used by the device of the invention.

Referring to FIG. 1, a motor driven vehicle, i.e. automobile, is diagrammatically shown in a typical construction of a rear wheel drive automobile, having internal combustion engine 10, torque converter 12, transmission 14, propeller shaft 16, differential gear unit 18, rear left axle 20L, rear right axle 20R, front left wheel 22FL, front right wheel 22FR, rear left wheel 22RL, rear right wheel 22RR, steering wheel 24, power steering unit 26, left tie rod 28FL, right tie rod 28FR, throttle valve 30, throttle valve actuator 32 and engine control 34 for controlling the throttle valve 30 via the actuator 32. The engine control 34 is an essential part of the device for controlling engine intake throttle according to the present invention. As a matter of course, a vehicle body not shown in the figure is supported by the four wheels 22FL–22RR via each suspension system not shown in the figure.

The engine control 34 is supplied with operation parameters such as yaw rate $\gamma$ from yaw rate sensor 38, wheel velocities Vwi of the four wheels from wheel velocity sensors 40$i$ (i=fl, fr, rl, rr) of the front left, front right, rear left and rear right wheels, lateral acceleration Gy from lateral acceleration sensor 42, torque converter output rotation speed Nto from torque converter output rotation speed sensor 44, shift position St of the transmission 14 from shift position sensor 46, engine rotation speed Ne from engine rotation speed sensor 48, steering torque Ts from steering torque sensor 50, hydraulic pressures Pr and Pl of right and left cylinders of the power steering unit 26 from steering pressure sensor 52, intake air flow Af from intake air flow sensor 54, intake manifold pressure Pin from manifold pressure sensor 56, depression Dacc of accelerator pedal not shown in the figure from accelerator pedal depression sensor 58, and brake operation signal Br from brake switch 60, and steering angle $\delta$ from steering angle sensor 62.

Although not shown in FIG. 1, the engine control 34 includes a microcomputer of a standard construction having central processing unit, read only memory, random access memory, input port means, output port means and bus means interconnecting those elements. The information signals from the above-mentioned sensors are generally input to the engine control 34 through the input port means of the microcomputer.

The intake throttle control device according to the present invention is composed of the engine control 34 and the sensors 38–62, some of which are essential, while some others are provided for better operation of the device.

Since the functional construction of the intake throttle control device according to the present invention is in fact an electronic program incorporated in the microcomputer of the engine control 34 as well known in this art, the construction of the intake throttle control device according to the present invention will be described in the form of the control operations thereof by referring to FIGS. 2–16.

Figure 2:
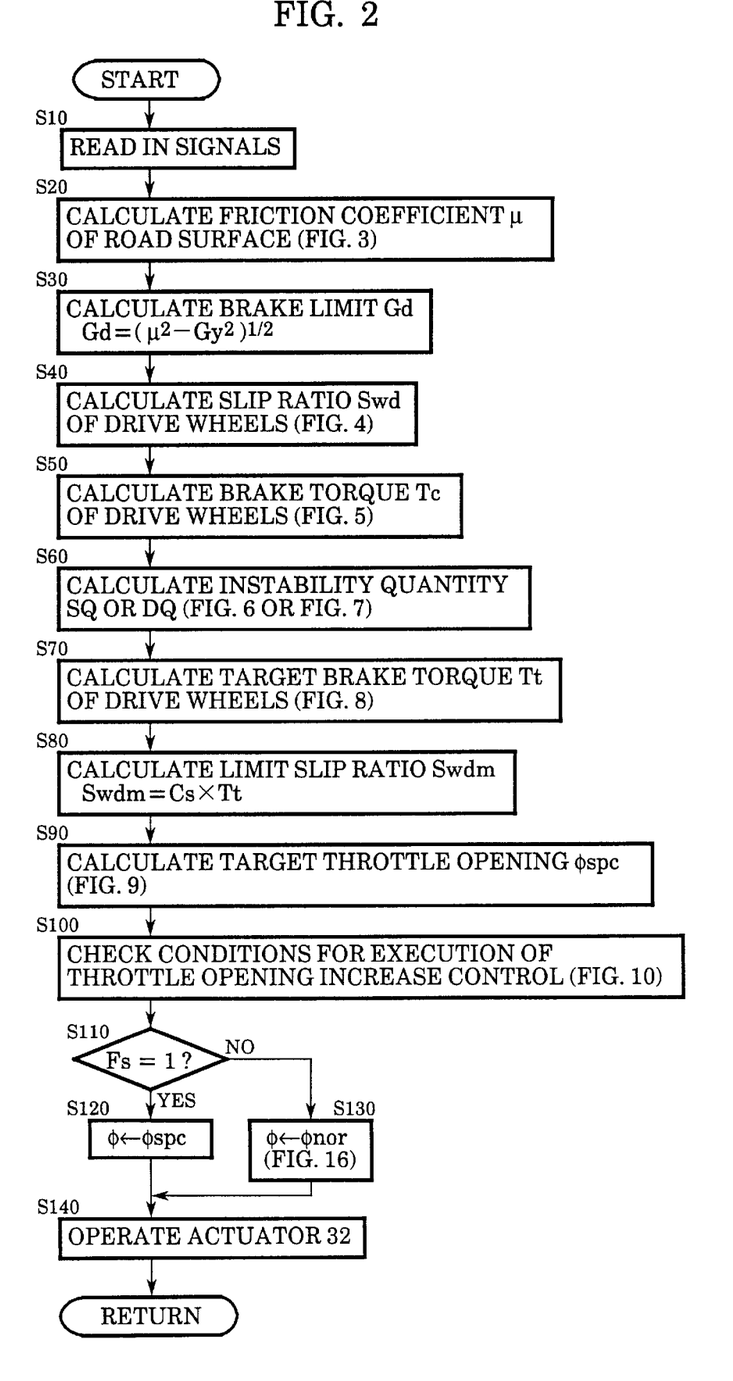
FIG. 2 is a main routine flowchart showing an overall control operation carried out by the device according to the present invention.

FIG. 2 shows an overall operation carried out by the intake throttle control device of the present invention in the form of a flowchart. The control operation according to this flowchart is started with closure of an engine ignition switch not shown in the figure of the vehicle and is cyclically repeated at a cycle time such as tens of microseconds throughout the operation of the vehicle, as well known in the art.

Figure 3:
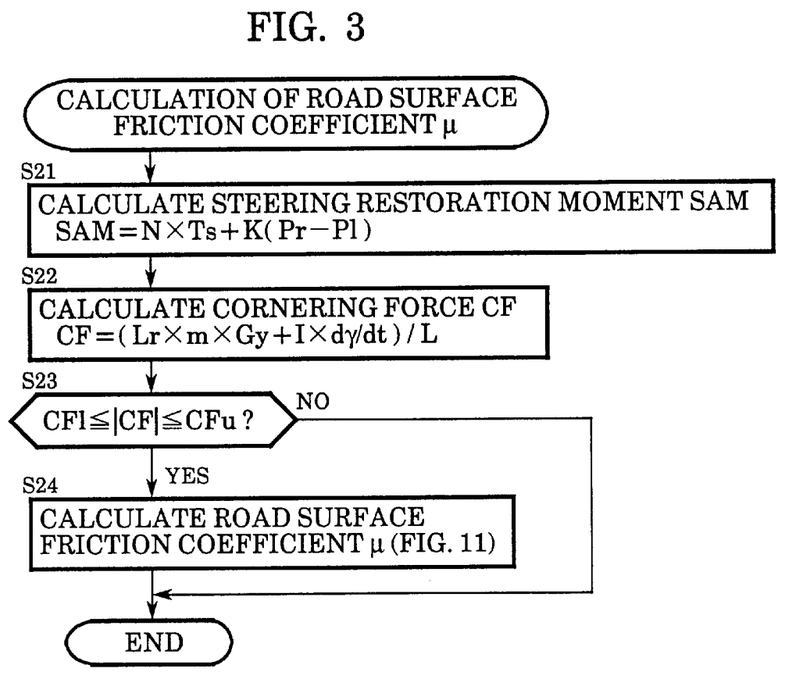
FIG. 3 is a flowchart showing a sub-routine conducted in step 20 of the main routine of FIG. 2.

When device is started, in step 10 signals are read in from the various sensors described above according to a schedule determined by the program incorporated in the device. Then in step 20, friction coefficient $\mu$ of road surface is estimated according to the sub-routine shown in FIG. 3. For estimating the friction coefficient of road surface, there have been proposed various methods. The method shown in FIG. 3 is described in detail in Japanese Patent Laid-open Publication 6-221968 filed by the same assignee as the present application. According to this method, in step 21 steering restoration moment SAM is calculated based upon gear ratio N of the steering system, the steering torque Ts obtained from the steering torque sensor 50, the right and left hydraulic pressures Pr and Pl of the power steering unit 26 obtained from the steering pressure sensor 52 and an appropriate proportioning factor K as follows:

$$SAM = N \times Ts + K(Pr - Pl)$$

In step 22, cornering force CF is calculated based upon distance Lr of the rear axle from the center of gravity of the vehicle body, mass m of the vehicle body, the lateral acceleration Gy obtained from the lateral acceleration sensor 42, moment of inertia I of the vehicle body, time based differentiation of yaw rate $\gamma$ obtained from the yaw rate sensor 38, and the wheel base L of the vehicle, as follows:

$$CF = (Lr \times m \times Gy + I \times d\gamma/dt)/L$$

Figure 11:
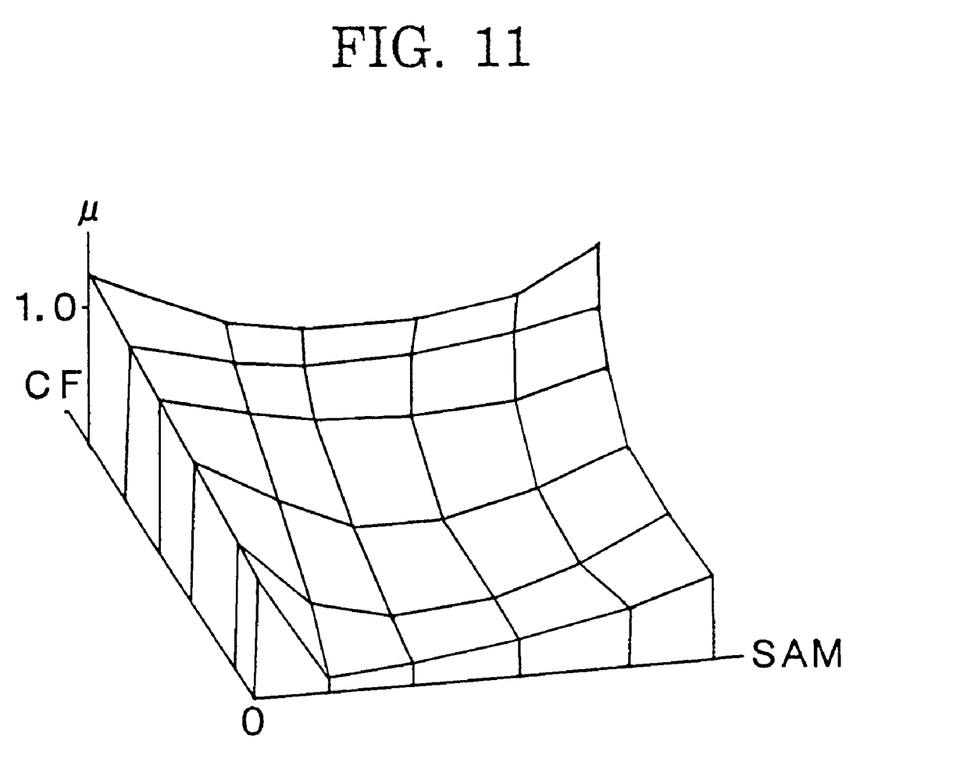
FIG. 11 is a perspective view of a three dimensional map showing the relationship among cornering force CF, steering restoration moment SAM and friction coefficient $\mu$ of road surface.

In step 23, it is checked if the absolute value of the calculated cornering force CF is between a lower limit CFl and an upper limit CFu predetermined therefor. As is usual in this art, parameters dependent on the direction of turn of the vehicle are expressed in positive when the vehicle is making a left turn and in negative when the vehicle is making a right turn. In step 24, referring to a map such as shown in FIG. 11 based upon the absolute value of CF and SAM, the friction coefficient $\mu$ of the road surface is estimated. The selection by step 23 means that if the absolute value estimated by a calculation such as shown in step 22 is in a region readable on the map of FIG. 11, friction coefficient $\mu$ is read out from the map, whereas if the cornering force calculated according to step 22 is out of the range readable in the map of FIG. 11 probably due to some temporal irregularities, renewal of the estimation of the friction coefficient is passed by for the next cycle. As also well known in the art, when the process must bypass step 24 in the initial cycle after the start of the control operation, an appropriate initial value such as 1.0 may be set for $\mu$.

Returning to the main routine of FIG. 2, in step 30, based upon the road surface friction coefficient $\mu$ thus obtained and the lateral acceleration Gy obtained from the lateral acceleration sensor 42, a brake limit Gd is calculated as follows:

$$Gd=(\mu^2-Gy^2)^{1/2}$$

The brake limit Gd is a parameter representing the availability of the braking effect at the drive wheels under the action of the engine braking. As well known in the art, the maximum tire grip available at a wheel is expressed by a product of the road surface friction coefficient $\mu$ and the vertical load corresponding to the share of the total mass of the vehicle body imposed on the particular wheel. On the other hand, the lateral force acting to a wheel by the lateral acceleration Gy is a product of Gy and the share of the total mass of the vehicle body distributed to the particular wheel. Therefore, considering that the tire grip force expressed by the product of $\mu$ and the load share is divided into a lateral vector force corresponding to the product of Gy and the mass share and a longitudinal vector force, Gd represents the maximum longitudinal vector force available by the braking of the wheel. The longitudinal vector force herein concerned is the force effected by the engine braking, as will be understood hereinbelow.

Figure 4:
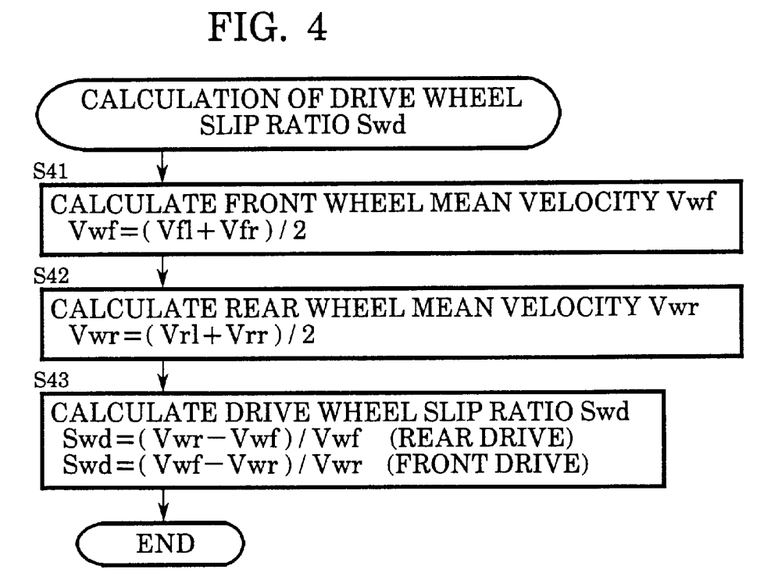
FIG. 4 is a flowchart showing a sub-routine conducted in step 40 of the main routine of FIG. 2.

In step 40, slip ratio Swd of the drive wheels is calculated according to the sub-routine shown in FIG. 4, as follows:

In steps 41 and 42, mean values of front left and front right wheel velocities and mean values of rear left and right wheel velocities are calculated as follows:

$$Vwf=(Vfl+Vfr)/2$$

$$Vrw=(Vrl+Vrr)/2$$

In step 43, according to whether the vehicle is a rear drive vehicle or a front drive vehicle, the drive wheel slip ratio Swd is calculated as follows:

Swd=(Vwr−Vwf)/Vwf for rear drive

Swd=(Vwf−Vwr)/Vwr for front drive

However, since the engine braked drive wheels are mere liable to slip at the one of them serving at the inside of the turn because of a less vertical load imposed thereon, it will be more desirable that the wheel slip ratio is calculated as a ratio of a difference between the wheel velocity of a drive wheel serving at the inside of a turn and the wheel velocity of a driven wheel to the wheel velocity of the driven wheel.

Figure 5:
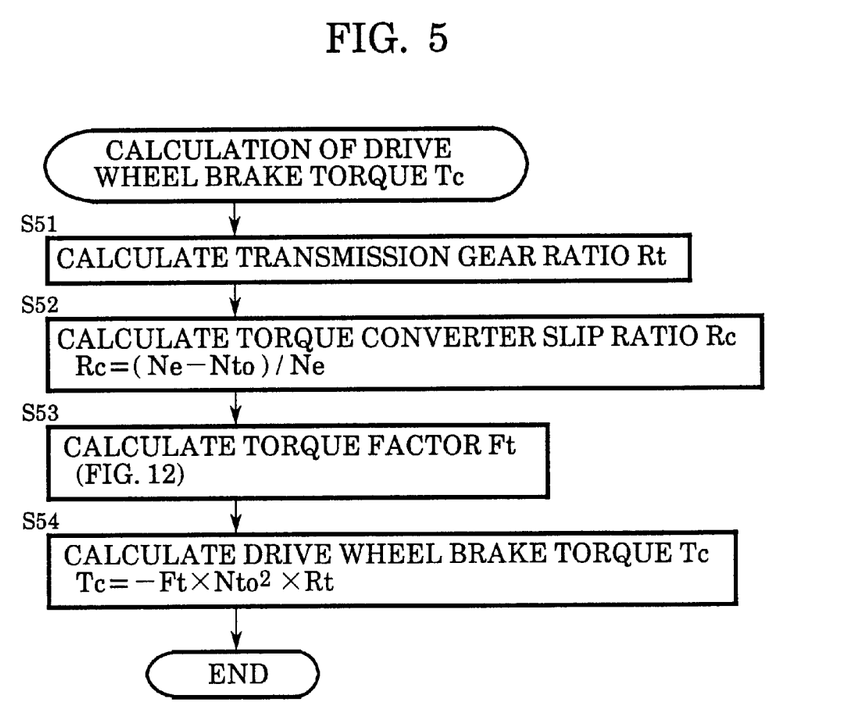
FIG. 5 is a flowchart showing a sub-routine conducted in step 50 of the main routine of FIG. 2.

Returning to the main routine of FIG. 2, in step 50, brake torque Tc of drive wheels is estimated according to the sub-routine of FIG. 5, as follows:

Referring to FIG. 5, in step 51, transmission gear ratio Rt is calculated according to the current shift position of the transmission. In step 52, torque converter slip ratio Rc is calculated based upon the engine rotation speed Ne obtained from the engine rotation speed sensor 48 and the torque converter output rotation speed Nto obtained from the torque converter output rotation speed sensor 44 as follows:

$$Rc=(Ne-Nto)/Ne$$

Figure 12:
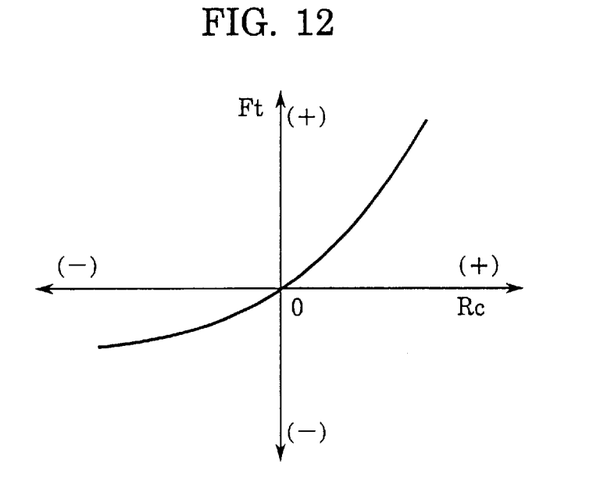
FIG. 12 is a map showing the relationship between torque factor Ft and torque converter slip ratio Rc.

In step 53, referring to a map such as shown in FIG. 12, torque factor Ft is calculated based upon the torque converter slip ratio Rc. Since in an engine braked operating condition, Nto is larger than Ne, Rc is negative, and therefore torque factor Ft is a negative value. In step 54, drive wheel brake torque Tc is calculated based upon Ft, Nto and Rt as follows:

$$Tc=-Ft \times Nto^2 \times Rt$$

As will be appreciated from the above equation, the torque factor Ft is a factor for estimating the torque of the drive wheels based upon the product of square of the torque converter output rotation speed and the transmission gear ratio.

Figure 6:
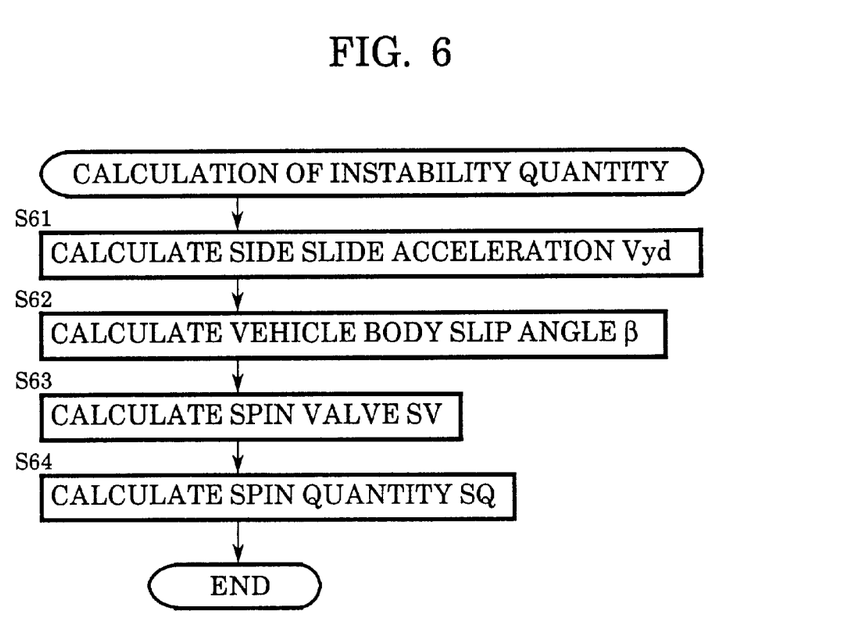
FIG. 6 is a flowchart showing a sub-routine conducted in step 60 of the main routine of FIG. 2.

Returning to the main routine of FIG. 2, in step 60, instability quantity SQ or DQ is calculated according to the sub-routine of FIG. 6 or the sub-routine of FIG. 7 according to whether the vehicle is a rear drive vehicle or a front drive vehicle as follows:

Referring to FIG. 6 applied to a rear drive vehicle, in step 61 side slide acceleration Vyd is calculated as a difference between the lateral acceleration Gy obtained from the lateral acceleration sensor 42 and a product of the yaw rate $\gamma$ obtained from the yaw rate sensor 38 and vehicle speed V available from the wheel velocities Vwi obtained from the wheel velocity sensors 40$i$, such as Vyd=Gy−$\gamma$×V. In step 62, slip angle $\beta$ of the vehicle body is calculated as a ratio of side slide velocity Vy of the vehicle body available by time based integration of Vyd and longitudinal velocity Vx of the vehicle body, i.e. vehicle speed, such as $\beta$=Vy/Vx. In step 63, a parameter herein called spin value SV is calculated by taking appropriate proportioning factors K1 and K2 as follows:

$$SV=K1 \times \beta + K2 \times d\ \beta/dt$$

As an alternative, spin vehicle SV may be estimated as a linear sum of the vehicle body slip angle $\beta$ and the side slide acceleration Vyd.

In step 64, a parameter herein called spin quantity SQ is calculated such that when the vehicle is making a left turn and the value of SV is positive, SQ is made equal to SV, while when the vehicle is making a left turn and the value of SV is negative, SV is made zero. Similarly, when the vehicle is making a right turn and the value of SV is negative, SV is made to be the absolute value of SV, while when the vehicle is making a right turn and the value of SV is positive, SQ is made zero. As will be appreciated from the above definition, the spin quantity SQ represents, by the magnitude thereof, the liability of the vehicle to spinning in left or right turn, indicating that the vehicle is more liable to spin as the value of SQ is greater.

Figure 7:
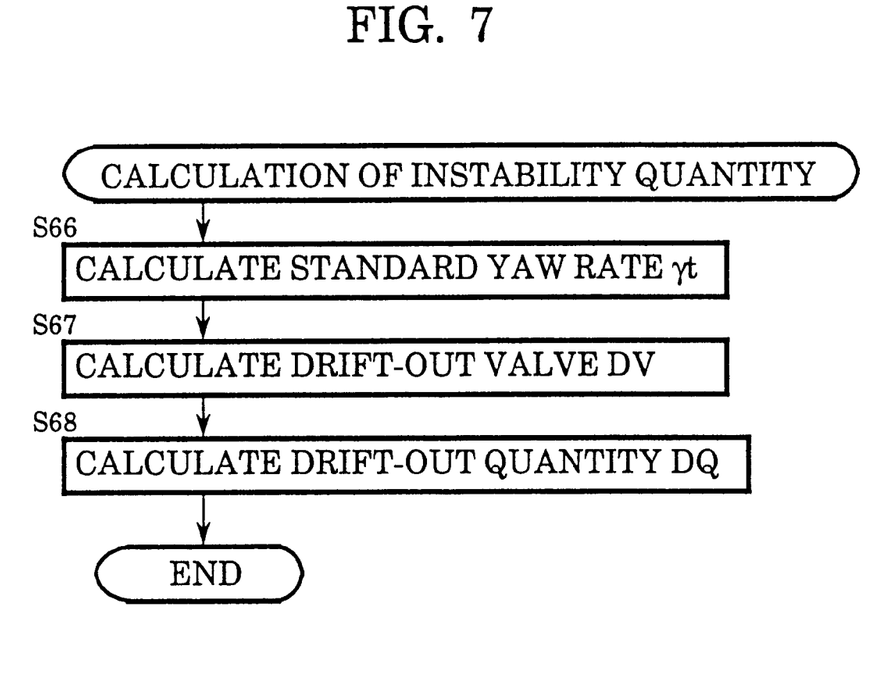
FIG. 7 is a flowchart showing an alternative sub-routine conducted in step 60 of the main routine of FIG. 2.

When the vehicle is a front drive vehicle, the instability quantity in step 60 of the main routine of FIG. 2 is calculated according to the sub-routine of FIG. 7. Referring to FIG. 7, in step 66, standard yaw rate $\gamma$t is calculated as follows:

First, based upon the vehicle speed V available from the wheel velocities Vwi obtained from the wheel velocity sensors 40$i$, the actual steering angle $\delta$ available from the steering angle sensor 62, wheel base L of the vehicle and an appropriate proportioning factor Kh, basic yaw rate $\gamma$c is calculated as follows, and then by applying a time delay modification thereto, standard yaw rate $\gamma$t is calculated as follows:

$$\gamma c = V \times \delta/(1+Kh \times V^2) \times L$$

$$\gamma t = \gamma c/(1+T \times s)$$

In step 67, a parameter herein called drift-out value DV is calculated as a difference between the standard yaw rate $\gamma$t and the actual yaw rate γ detected by the yaw rate sensor 38 or a product of such a difference and a ratio of wheel base to vehicle speed as follows:

$$DV=\gamma t-\gamma$$

$$DV=(\gamma t-\gamma)\times L/V$$

In step 68, a parameter herein called drift-out quantity DQ is calculated such that, when the vehicle is making a left turn and the DV is positive, DQ is equal to DV, while when the vehicle is making a left turn and DV is negative, DQ is made zero. Similarly, when the vehicle is making a right turn and the DV is negative, DQ is made to be equal to the absolute value of DV, while when the vehicle is making a right turn and DV is positive, DQ is made zero.

Figure 8:
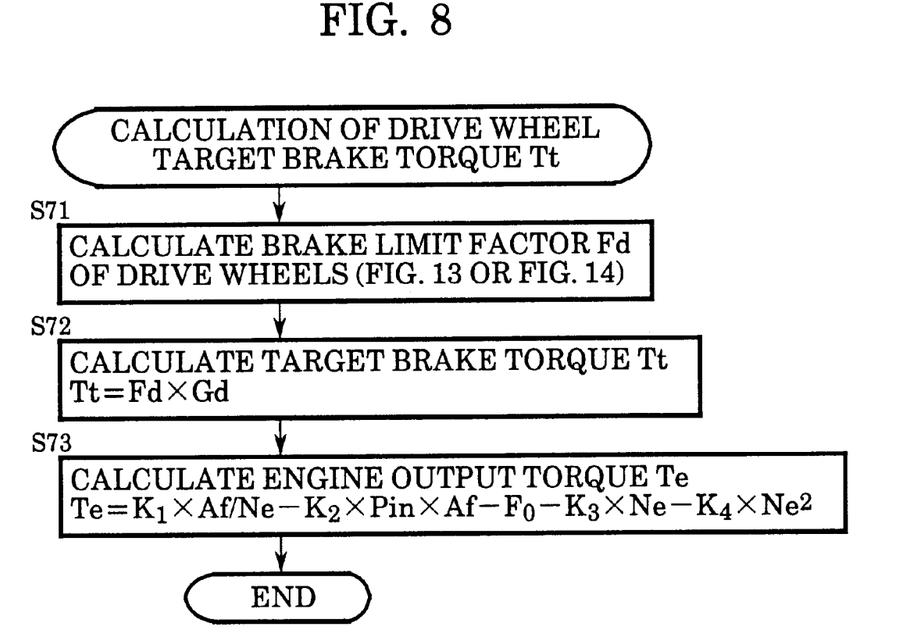
FIG. 8 is a flowchart showing a sub-routine conducted in step 70 of the main routine of FIG. 2.
Figure 13:
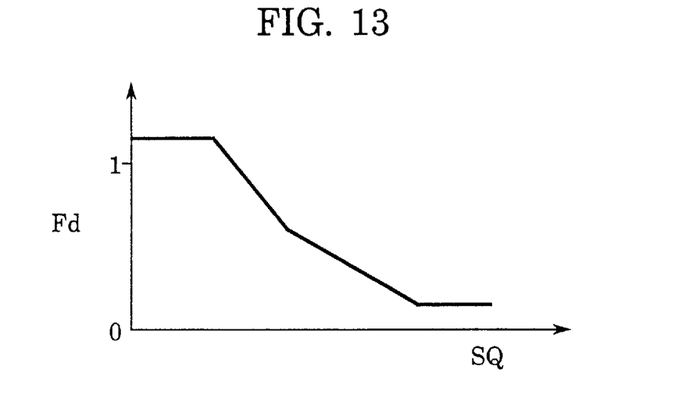
FIG. 13 is a map showing the relationship between brake limit factor Fd and spin quantity SQ.
Figure 14:
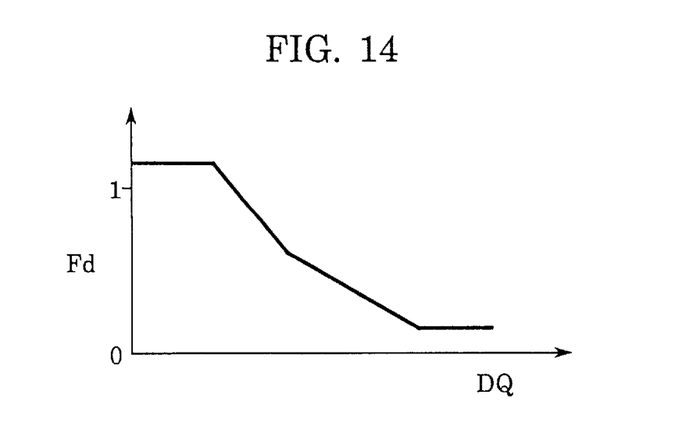
FIG. 14 is a map showing the relationship between brake limit factor Fd and drift-out quantity DQ.

Returning to the main routine of FIG. 2, in step 70, target brake torque Tt of drive wheels is calculated according to the sub-routine shown in FIG. 8 as follows:

Referring to FIG. 8, in step 71, brake limit factor Fd is calculated according to a map such as shown in FIG. 13 or a map shown in FIG. 14 according to whether the vehicle is a rear drive vehicle or a front drive vehicle. In other words, when the vehicle is a rear drive vehicle, the brake limit factor Fd is obtained from the map of FIG. 13 based upon the magnitude of the spin quantity SQ, while if the vehicle is a front drive vehicle, the brake limit factor Fd is obtained from the map of FIG. 14 based upon the magnitude of the drift-out quantity DQ. In step 72, target brake torque Tt is calculated as a product of Fd and the brake limit Gd obtained in step 30 of the main routine of FIG. 2 as follows:

$$Tt=Fd\times Gd$$

As will be appreciated from the above, the target brake torque Tt represents a maximum magnitude of engine braking allowable at the drive wheels in the quantity of torque within a limit ensuring the stability of the vehicle against the spinning in the case of a rear drive vehicle or against the drifting out in the case of a front drive vehicle.

Returning to the main routine of FIG. 2, in the step 80, limit slip ratio Swdm is calculated as a value proportional to the target brake torque Tt with a proportioning factor Cs as follows:

$$Swdm=Cs\times Tt$$

The limit slip ratio Swdm represents a maximum value for the slip ratio Swd of the drive wheel or wheels allowable to meet with the current spin quantity or drift-out quantity not to cause a spin or a drift-out.

Figure 9:
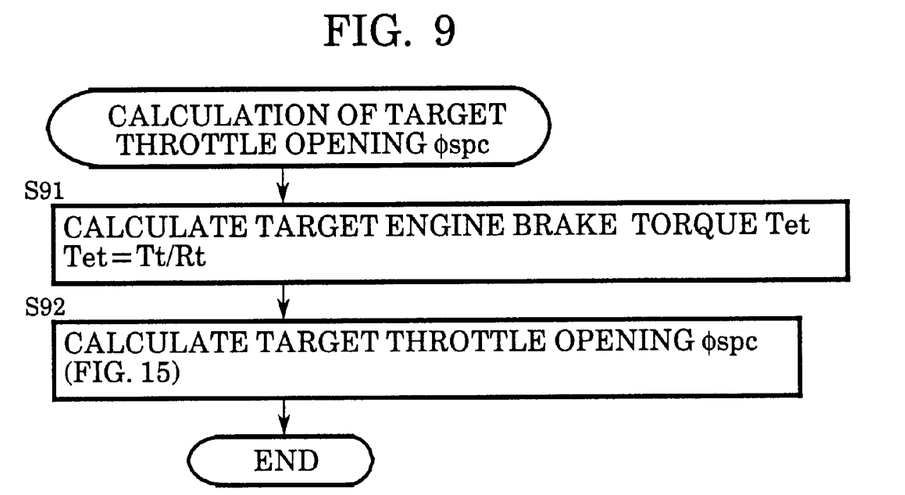
FIG. 9 is a flowchart showing a sub-routine conducted in step 90 of the main routine of FIG. 2.

In step 90, target throttle opening φspc is calculated according to the sub-routine shown in FIG. 9 as follows:

Referring to FIG. 9, in step 91, target engine brake torque Tet is calculated based upon the target brake torque Tt obtained in step 70 and the transmission gear ratio Rt obtained in step 51 of FIG. 5 as follows:

$$Tet=Tt/Rt$$

Figure 15:
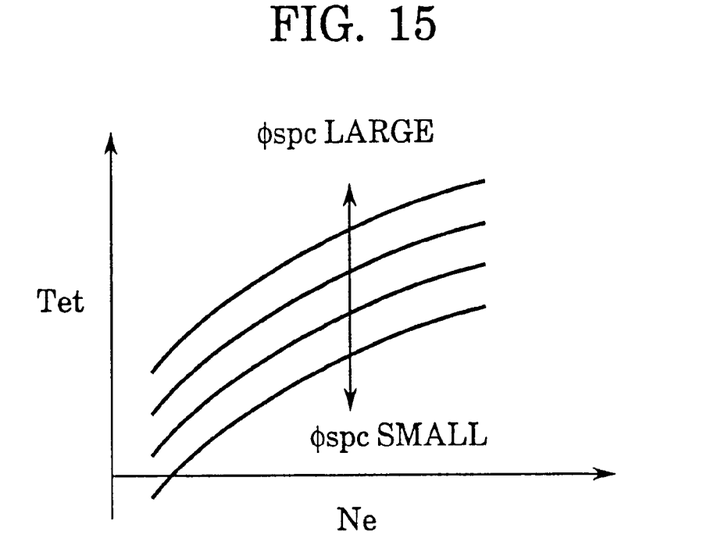
FIG. 15 is a map showing the relationship among target engine brake torque Tet, engine rotation speed Ne and target throttle opening $\phi$spc.

In step 92, target throttle opening φspc is obtained by referring to a map such as shown in FIG. 15 based upon the target engine brake torque Tet and the engine rotation speed Ne obtained from the engine rotation speed sensor 48. The target throttle opening φspc represents a throttle opening of the engine which provides the target engine brake torque Tet while the engine is rotating at a current engine rotation speed Ne.

Figure 10:
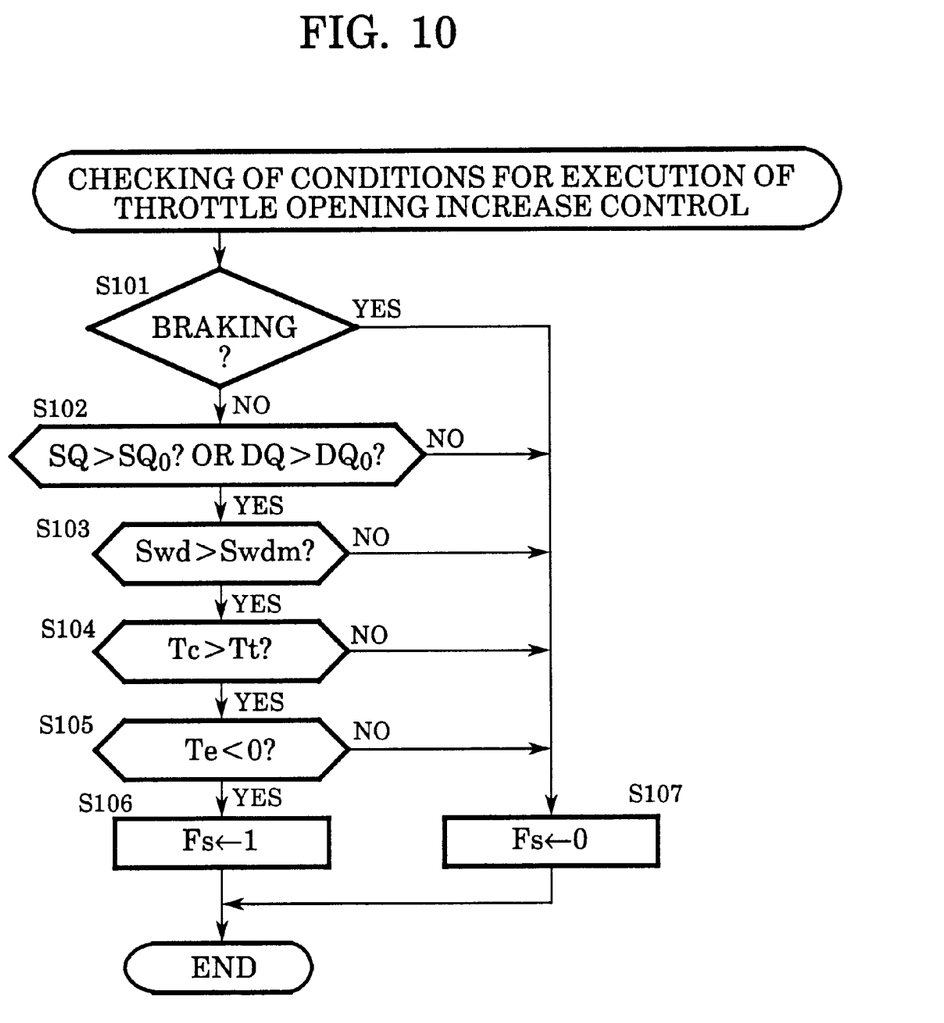
FIG. 10 is a flowchart showing a sub-routine conducted in step 100 of the main routine of FIG. 2.

Returning to the main routine of FIG. 2, in step 100, conditions for execution of the throttle opening increase control are checked according to the sub-routine of FIG. 10 as follows:

Referring to FIG. 10, in step 101, it is checked if the vehicle is being braked by the driver depressing the brake pedal according to the braking signal Br obtained from the brake switch 60. If the vehicle is being braked by a depression of the brake pedal by a driver, the intake throttle control according to the present invention is not executed, considering that during the braking of the vehicle by the foot brake system it is difficult to accurately estimate the slip ratio of the vehicle body and the wheels. Therefore, when the answer of step 101 is yes, the control proceeds to step 107, and flag Fs is set to 0 not to execute the control operation by the device according to the present invention.

When the answer of step 101 is no, in step 102 it is checked if the spin quantity SQ is greater than a threshold value SQo determined therefor or the drift-out quantity DQ is greater than a threshold value DQo determined therefor. When the answer of step 102 is no, the control also proceeds to step 107, because in such an operating condition of the vehicle it is not necessary to operate the engine throttle control according to the present invention.

When the answer of step 102 is yes, the control proceeds to step 103, and it is checked if the slip ratio Swd of the drive wheel or wheels obtained in step 40 of the main routine is greater than the limit slip ratio Swdm obtained in step 80 of the main routine. When the answer is no, the control also proceeds to step 107, because in such an operating condition of the vehicle it is again not necessary to execute the engine throttle control according to the present invention.

When the answer of step 103 is yes, the control proceeds to step 104, and it is checked if the brake torque Tc is greater than the target brake torque Tt obtained in step 70 of the main routine. If the answer is yes, there is a room for decreasing the current brake torque Tc to the target brake torque Tt, whereas if the answer is no, there is no room for decreasing the current brake torque Tc to the target brake torque Tt, i.e. there is no room for executing the intake throttling attenuation control by the device of the present invention. Therefore, the control proceeds to step 105 or step 107 according to whether the answer of step 104 is yes or no.

In step 105, it is checked if the engine output torque Te calculated in step 73 of FIG. 8 is zero or not. This is a step for final confirmation that the engine is operating in an engine braked condition so that the control by the device according to the present invention to suppress the vehicle against pinning or drifting out by attenuation of the engine braking is meaningful. If the answer is no, the control proceeds to step 107. When the answer of step 105 is yes, the control finally reaches step 106, and flag Fs is set to 1.

Returning to the main routine of FIG. 2, in step 110, it is checked if flag Fs is 1 or not. If the answer is yes, the control proceeds to step 120, and intake throttle opening φ is set to the target throttle opening φspc obtained in step 90. As will be appreciated from the forgoing, by the throttle opening φ being set to φspc, the intake throttle will be opened by a minimum shift to attenuate the engine braking so that the spin quantity SQ or the drift-out quantity DQ is brought back below the threshold value SQo or DQo while keeping the engine braking effect as high as possible within a trimming border defined by SQo or DQo. Since the target throttle opening φspc is calculated based upon the map of FIG. 13 or FIG. 14 with reference to the spin quantity SQ or the drift-out quantity DQ, the target throttle opening φspc is always determined according to the current liability of the vehicle to spin or drift out. Therefore, the target throttle opening φspc is always estimated to trace the border between stability and instability regarding spin or drift-out. In such a close trimming control, if the target throttle opening φspc deviates on a larger side of the border, the spin quantity SQ or the drift-out quantity DQ will cease to be greater than SQo or DQo, whereby the control proceeds to step 107, dissolving the intake throttle increasing control, whereby SQ or DQ will shift toward increase, if the running conditions for inducing the spin out or the drift-out still remain. Thus, through the alternative proceeding at step 102 in relation to the calculation of the target throttle opening φspc in step 90, an automatic feedback control of adjusting engine intake throttle is accomplished so as to trace the border between stability and instability of the running behavior of the vehicle.

Figure 16:
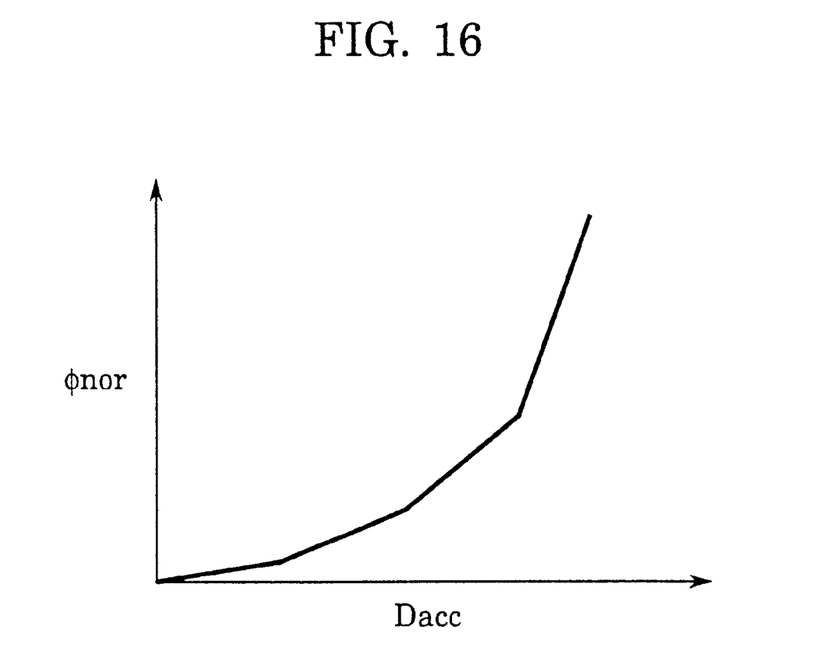
FIG. 16 is a map showing the relationship between normal throttle opening $\phi$nor and accelerator pedal depression Dacc.

When the answer of step 110 is no, the control proceeds to step 130, and throttle opening φ is set to normal throttle opening φnor according to a map such as shown in FIG. 16 based upon the depression Dacc of accelerator pedal by the driver to ensure the normal driving of the vehicle.

In step 140, the engine control 34 operates the actuator 32 according to the throttle openings φspc or φnor.

Although the present invention has been described in detail with reference to some preferred embodiments thereof, it will be apparent for those skill in the art that various modifications are possible without departing from the spirit of the present invention.

I claim:

1. A device for controlling intake throttle of an engine of a vehicle having a vehicle body, and pairs of front and rear wheels supporting the vehicle body, at least the pair of rear wheels or the pair of front wheels being drive wheels adapted to be driven by the engine, the intake throttle control device comprising:

a means for estimating an instability quantity representative of turning instability of the vehicle;

a means for estimating lateral acceleration of the vehicle;

a means for estimating friction coefficient of road surface;

a means for estimating a brake limit of the pair of drive wheels based upon the lateral acceleration and the road surface friction coefficient;

a means for estimating an engine brake torque limit based upon said brake limit of the pair of drive wheels and said instability quantity;

a means for estimating a target intake throttle value corresponding to said engine brake torque limit; and a means for attenuating intake throttling of the engine to said target intake throttle value when the intake throttling is tighter than said target intake throttle value.

2. An intake throttle control device according to claim 1, wherein the vehicle is adapted such that the pair of rear wheels are driven by the engine, and said instability quantity estimation means estimates a spin quantity representing liability of the vehicle to a spin as said instability quantity.

3. An intake throttle control device according to claim 1, wherein the vehicle is adapted such that the pair of front wheels are driven by the engine, and said instability quantity estimation means estimates a drift-out quantity representing liability of the vehicle to a drift-out as said instability quantity.

4. An intake throttle control device according to claim 1, wherein the intake throttle control device further comprises a means for estimating slip ratio of at least one of the pair of drive wheels, and a means for gating said intake throttling attenuation means to allow said intake throttling attenuation operation when and only when the slip ratio of said at least one drive wheel is larger than a threshold value determined therefor.

5. An intake throttle control device according to claim 1, wherein the intake throttle control device further comprises a means for estimating engine output torque, and a means for gating said intake throttling attenuation means to allow said intake throttling attenuation operation when and only when the engine output torque is negative.

6. An intake throttle control device according to claim 1, wherein the vehicle has a foot brake system, and the intake throttle control device further comprises a means for detecting operation of the foot brake system, and a means for gating said intake throttling attenuation means to allow said intake throttling attenuation operation when and only when said foot brake system operation detection means is not detecting operation of the foot brake system.

* * * * *